United States Patent
Lin et al.

(10) Patent No.: US 8,428,173 B2
(45) Date of Patent: Apr. 23, 2013

(54) DEMODULATION METHOD FOR MIMO SYSTEMS

(75) Inventors: Tao Lin, Mulgrave (AU); Boon Loong Ng, Mulgrave (AU); Thirukkumaran Sivahumaran, Mulgrave (AU)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/145,004

(22) PCT Filed: Jan. 15, 2010

(86) PCT No.: PCT/JP2010/050745
§ 371 (c)(1),
(2), (4) Date: Sep. 21, 2011

(87) PCT Pub. No.: WO2010/084931
PCT Pub. Date: Jul. 29, 2010

(65) Prior Publication Data
US 2012/0002759 A1    Jan. 5, 2012

(30) Foreign Application Priority Data
Jan. 21, 2009  (AU) .............................. 2009900235

(51) Int. Cl.
*H04B 7/02*    (2006.01)
(52) U.S. Cl.
USPC ........... 375/267; 375/260; 375/262; 375/265; 375/340; 375/343; 375/346; 375/347; 375/350
(58) Field of Classification Search ............... 375/267, 375/340, 260, 262, 265, 343, 346, 350; 370/203, 370/204, 205, 208, 209, 210
See application file for complete search history.

(56) References Cited

U.S. PATENT DOCUMENTS 8,223,870 B2 *   7/2012   Waters et al. ................. 375/267
8,243,842 B2 *   8/2012   Oka .............................. 375/267

FOREIGN PATENT DOCUMENTS

JP    2006-121348    5/2006
JP    2009-33636     2/2009

OTHER PUBLICATIONS

Kimura, Ryota et al., "A Multi-QR-Decomposition Assisted Group Detection Algorithm or MIMO-OFDM", IEICE Technical Report, RCS 106 (223), Aug. 24, 2006, pp. 115-120.
Adachi, Koichi et al., "Iterative Modified QRM-MLD Based on CRC Check for OFDM MIMO Multiplexing", IEICE Technical Report, RCS 105 (411), Nov. 10, 2005, pp. 25-30.
Maeda, Noriyuki et al., "MLD with QR Decomposition Using Bi-Directional Ranking and Selection of Surviving Symbol Replica for VSF-Spread OFDM MIMO Multiplexing", Technical Report of IEICE, A.P. 104 (397), Oct. 23, 2004.
Hwang, Keun Chul et al., "Iterative Joint Detection and Decoding for MIMO-OFDM Wireless Communications", Signals, Systems and Computers, Fortieth Asilomar Conference, Nov. 1, 2006, pp. 1752-1756.
International Search Report dated Mar. 2, 2010 issued in PCT/JP2010/050745.

* cited by examiner

*Primary Examiner* — Dhaval Patel
(74) *Attorney, Agent, or Firm* — Scully, Scott, Murphy & Presser PC (57) ABSTRACT

A method for processing a plurality of data streams from a transmitter, includes: receiving symbols via the plurality of data streams; generating a channel matrix; sorting the channel matrix to provide a sorted channel matrix; performing QR decomposition on the sorted channel matrix and a column-row-swapped-sorted-channel matrix; performing QR equalization on a sorted received symbol vector and a swapped received symbol vector to provide a equalized-sorted vector and a equalized-swapped-sorted vector; processing first and second portions of the equalized-sorted vector and the equalized-swapped-sorted vector via a QR-MLD demodulation scheme to determine soft bits and soft symbols; and rearrange soft bits in the above steps to provide an output vector.

12 Claims, 5 Drawing Sheets

DEMODULATION METHOD FOR MIMO SYSTEMS

PRIORITY CLAIM

Priority is claimed on Australian Provisional Patent Application No. 2009900235, filed Jan. 21, 2009, the content of which is incorporated herein by reference.

TECHNICAL FIELD

The present invention relates to wireless communications systems, and more particularly to a method for demodulating data transmitted over wireless communications systems.

BACKGROUND ART

In wireless communications, techniques exist to improve spectral efficiency. For example, receivers are provided with hardware which carry out techniques such as QR demodulation, or MLD (maximum likelihood detection). However, many of these receivers are complex.

Existing methods allow two independent data streams, for example: 2 transmit-2 receive antenna (2×2) multiple input-multiple output (MIMO) systems using a 2×2 QR-MLD demodulator. A problem arises when it is desired to extend the 2×2 QR-MLD demodulator to handle four independent data streams (e.g. a 4×4 MIMO system) or even eight independent data streams (e.g. 8×8 MIMO system) since it is not straightforward. This is due to the complexity of the hardware implementation associated with a 4×4 demodulation scheme where MLD is applied. This hardware complexity in turn leads to a larger chip size and increased power consumption.

This problem is exacerbated by the need for present receivers in wireless communication systems to be able to demodulate transmitted data with a variety of different methods.

It would therefore be desirable to provide a method of demodulating transmitted data for 4×4 MIMO systems or 8×8 MIMO systems which can utilize existing 2×2 demodulators but without complexity.

It will be appreciated that a reference herein to any matter which is given as prior art is not to be taken as an admission that that matter was, in Australia or elsewhere, known or that the information it contains was part of the common general knowledge as at the priority date of the claims forming part of this specification.

DISCLOSURE OF INVENTION

With this in mind, one aspect of the present invention provides a method for processing a plurality of data streams from a transmitter, the method including:

(a) receiving symbols via the plurality of data streams, the received symbols being represented by a received symbol vector y;

(b) generating an N×N channel matrix H, where N is the number of data streams;

(c) sorting the N×N channel matrix H to provide an N×N sorted channel matrix H(S);

(d) performing QR decomposition on the sorted channel matrix H(S) to compute a Q(S) matrix and an R(S) matrix such that H(S)=Q(S)R(S), the Q(S) matrix being a unitary matrix and the R(S) matrix being an upper triangular matrix;

(e) performing QR decomposition on a column-row-swapped-sorted-channel matrix H(S̃) to compute the corresponding Q(S̃) matrix and R(S̃) matrix such that H(S̃)=Q(S̃)× R(S̃), the Q(S̃) matrix being a unitary matrix and the R(S̃) matrix being an upper triangular matrix;

(f) performing QR equalization on a sorted received symbol vector y(S) to provide an equalized-sorted vector z(S);

(g) performing QR equalization on a swapped received symbol vector y(S̃) to provide an equalized-swapped-sorted vector z(S̃);

(h) processing a first portion of z(S) and z(S̃) via a QR-MLD demodulation scheme to determine soft bits and soft symbols;

(i) processing a second portion of z(s) and z(S̃) via a QR-MLD demodulation scheme to determine soft bits and soft symbols;

(j) rearranging the soft bits in steps (h) and (I) to provide an output vector b.

Advantageously, the present invention utilizes much of the functional components of the 2×2 QR-MLD demodulator to process a 4×4 MIMO system or even and 8×8 MIMO system without significant complexity.

Preferably, N=4 and sorting of the 4×4 channel matrix H to provide a 4×4 sorted channel matrix H(S) at step (c) includes the following steps:

(a) generating 4 pre-arranged matrices H(1), H(2), H(3) and H(4);

(b) performing QR decomposition to H(t)=Q(t)×R(t), t∈{1, 2, 3, 4};

(c) utilizing an element of each R matrix for sorting such that $S = \lfloor s_1, s_2, s_3, s_4 \rfloor$.

Preferably, the element is the 4th row and the 4th column of each R matrix $R_{44}$ for sorting such that $S = \lfloor s_1, s_2, s_3, s_4 \rfloor$.

Preferably, N=4 and sorting of the 4×4 channel matrix H to provide a 4×4 sorted channel matrix H(S) at step (c) includes the following steps:

(a) calculating the norm of each column of the channel matrix H (b) comparing the norm of each column [E(1), E(2), E(3) and E(4)] to obtain a sorted a sorted vector $S = \lfloor s_1, s_2, s_3, s_4 \rfloor$.

Preferably, N=4 and the sorted channel matrix H(S) is given by the expression: $H(S) = \lfloor h(s_1)\ h(s_2)\ h(s_3)\ h(s_4) \rfloor = Q(S) \times R(S)$.

Preferably, N=4 and the column-row-swapped-sorted-channel matrix H(S̃) is given by the expression:

$$H(\tilde{S}) = \begin{bmatrix} h_{2s_2} & h_{2s_1} & h_{2s_4} & h_{2s_3} \\ h_{1s_2} & h_{1s_1} & h_{1s_4} & h_{1s_3} \\ h_{4s_2} & h_{4s_1} & h_{4s_4} & h_{4s_3} \\ h_{3s_2} & h_{3s_1} & h_{3s_4} & h_{3s_3} \end{bmatrix} = Q(\tilde{S}) \times R(\tilde{S})$$

Preferably, N=4 and performing QR equalization on a sorted received symbol vector y(S) to provide an equalized-sorted vector z(S) is determined by the following steps:

(a) multiplying a sorted received symbol vector y(S) by the Hermitian $Q^H(S)$ of the Q(S) matrix such that $z(S) = Q^H(S)y(S)$;

(b) obtaining the equalized-sorted vector z(S).

Preferably, N=4 and performing QR equalization by multiplying the swapped received symbol vector y(S̃) by the Hermitian $Q^H(\tilde{S})$ of the Q(S̃) matrix such that $z(\tilde{S}) = Q^H(\tilde{S}) \times R(\tilde{S})$ where z(s) is the equalized-swapped-sorted vector.

Preferably, the first portion of z(S) and z(S̃) is used to calculate the soft bits $x_{S_3}$, $x_{S_4}$. Preferably, the first portion of z(s) and z(S̃) is processed by existing 2×2 demodulators, thereby outputting the soft bits $x_{S_3}$, $x_{S_4}$.

Preferably, a total distance metric $d_{total\_j}$ is calculated to provide soft symbol $\hat{x}_{s_4}$ and $\hat{x}_{s_3}$.

Preferably, by subtracting soft symbol $\hat{x}_{s_4}$ and $\hat{x}_{s_3}$ from the second portion of z(S) and z(Ŝ), the residual of the second portion is processed by one or more existing 2×2 demodulators, thereby outputting soft bits $x_{S_1}$, $x_{S_2}$.

Preferably, the soft bits $x_{S_1}$, $x_{S_2}$, $x_{S_3}$, $x_{S_4}$ are fed into a Forward Error Correction (FEC) decoder for further processing.

Preferably, the soft bits $x_{S_1}$, $x_{S_2}$, $x_{S_3}$, $x_{S_4}$ rearranged to provide an output vector b.

BRIEF DESCRIPTION OF THE DRAWINGS

The following description refers in more detail to the various features and steps of the present invention. To facilitate an understanding of the invention, reference is made in the description to the accompanying drawings where the invention is illustrated in a preferred embodiment. It is to be understood however that the invention is not limited to the preferred embodiment illustrated in the drawings.

In the drawings.

EXEMPLARY EMBODIMENT FOR CARRYING OUT THE INVENTION

Figure 1:
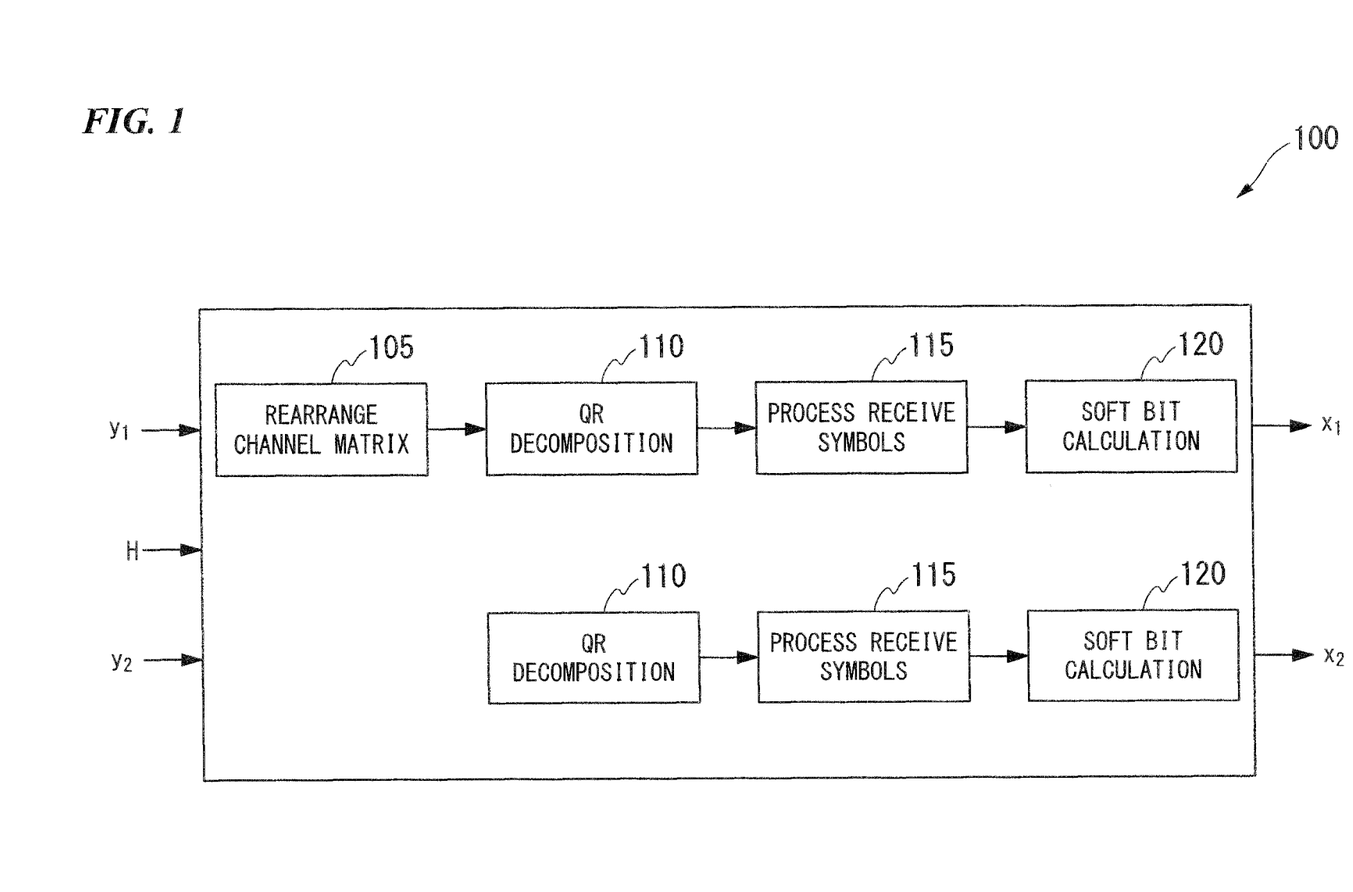
FIG. 1 is a block diagram of the components of a prior art 2×2 QR-MLD demodulator.

Referring now to FIG. 1, there is shown a 2×2 QR-MLD demodulator 100 which has a number of inputs including received data I/Q on a first receiver $y_1$ and a second receiver $y_2$ together with a channel matrix H for channel estimation. The 2×2 QR-MLD demodulator 100 has a number of modules within it so as to provide an output of demodulated soft bits on two output streams $x_1$ and $x_2$. The rearrange channel module 105 takes channel estimates and received symbols from each receive antenna $y_1$ and $y_2$) and rearranges them so that the appropriate transmitted symbol can be demodulated. Next, the QR decomposition module 110 performs the QR decomposition on the channel matrix provided by the output of the rearrange channel matrix module 105. Following this, the receive symbol processing module 115 multiplies a constructed receive symbol vector by the Hermitian of the Q matrix provided by the QR decomposition module 110. Finally, the soft bit calculation module 120 calculates the soft bits for each transmitted symbol using Euclidean distance metrics. The working of the 2×2 QR-MLD demodulator will be known to those skilled in the art and will not be described in more detail. Advantageously, the present invention utilizes much of the functional components of the 2×2 QR-MLD demodulator to process a 4×4 MIMO system or even and 8×8 MIMO system without significant complexity.

Figure 2:
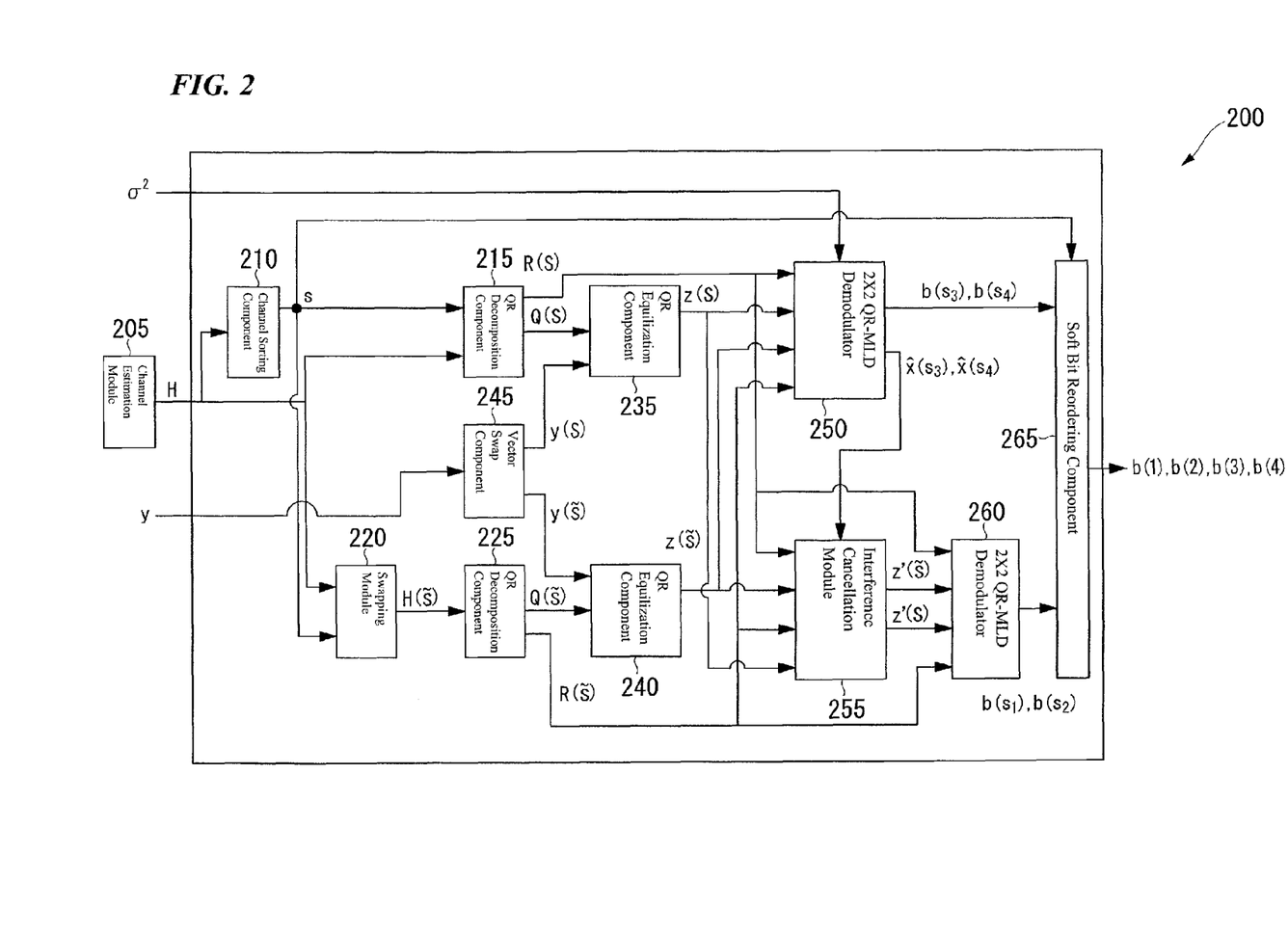
FIG. 2 is a block diagram of the components of a 4×4 QR-MLD demodulator according to an embodiment of the present invention.

FIG. 2 shows a 4×4 QR-MLD demodulator 200 according to an embodiment of the present invention which has a number of inputs (in this case N×1, where N=4) via received symbol vector y. A channel matrix H is also provided for channel estimation by the channel estimation module 205. Finally, a variance $\sigma^2$ is included for use in calculating soft symbol calculation at the QR-MLD demodulation module 250 which will be described below. The channel matrix H feeds into the channel sorting component 210 to perform matrix column sorting in order to obtain a sorted channel matrix H(S) which improves the demodulation process by detecting the strongest streams first. The sorted channel matrix H(S) is fed to a soft bit reordering component 265, a QR decomposition component 215 and a swapping module 220. There are two options for channel sorting and each will be described with reference to FIGS. 3 and 4. The channel matrix H is also fed into a QR decomposition component 215 and the swapping module 220. The swapping module 220 takes the channel matrix H and sorted channel matrix H(S) and swaps the rows and columns to produce a column-row-swapped-sorted-channel matrix H(Ŝ). Advantageously, column and row swapping of the channel matrix H(S) utilizes the existing 2×2 QR-MLD scheme with minimal increased complexity. In the prior art 2×2 QR-MLD shown in FIG. 1, the column and row of the 2×2 channel matrix are swapped in order to demodulate the data of the second stream. In the present invention for 4×4 QR-MLD, 4 independent streams are grouped into 2 groups after sorting, (i.e., s1+s2 and s3+s4). The existing 2×2 QR-MLD can be applied to each group. Therefore, column and row swapping in the present invention is required in order to use the 2×2 QR-MLD scheme with ONLY two 4×4 QR decomposition after sorting. Otherwise, 4 QR decomposition after sorting may be needed.

The QR decomposition component 215 performs QR decomposition on the sorted channel matrix H(S) to compute a Q(S) matrix and an R(S) matrix such that H(S)=Q(S)R(S), the Q(S) matrix being a unitary matrix and the R(S) matrix being an upper triangular matrix. The upper triangular matrix R(S) output from the QR decomposition component 215 is fed into a 2×2 QR-MLD demodulator 250, 260 (such as that shown in FIG. 1) together with the interference cancellation module 255. The use of the existing 2×2 QR-MLD demodulator 250, 260 is together with a successive interference cancellation (SIC) scheme. One major problem of SIC scheme is the error propagation where the error replica of the first detection will be propagated to the rest of the detection and degrade the performance of the following detection. The present invention overcomes this problem by sorting, (so that the strongest streams are detected first) and using soft symbols for interference cancellation.

The unitary matrix Q(S) is fed into a QR equalization component 235. The swapped channel matrix H(Ŝ) is fed into a QR decomposition component 225 which performs QR decomposition on the swapped channel matrix H(Ŝ) to compute a swapped Q(Ŝ) matrix and a swapped R(Ŝ) matrix such that H(Ŝ)=Q(Ŝ)×R(Ŝ), the Q(S) matrix being a unitary matrix and the R(S) matrix being an upper triangular matrix. The swapped upper triangular matrix R(Ŝ) output from the QR decomposition component 225 is fed into a 2×2 QR-MLD demodulator 250, 260 (such as that shown in FIG. 1) together with the interference cancellation module 255. The swapped unitary matrix Q(Ŝ) is fed into a QR equalization component 240.

The QR equalization component 235 further receives an input in the form of a sorted received symbol vector y(S) and the QR equalization component 240 further receives an input in the form of a swapped received symbol vector y(Ŝ) which is produced by a vector swap component 245. The vector swap component 245 takes as input, a received symbol vector y and produces a sorted received symbol vector y(S) and a swapped received symbol vector y(Ŝ).

The QR equalization component 235 multiplies the sorted received signal vector y(S) by the Hermitian of Q(S), namely $z(S)=Q^H(S)y(S)$ to produce a equalized-sorted vector z(S) which is fed into the 2×2 QR-MLD demodulator 250 as well as the interference cancellation module 255.

The QR equalization component 240 multiplies the swapped received signal vector y(Š) by the Hermitian of Q(Š), namely $z(Š)=Q^H(Š)×y(Š)$ to produce a equalized-swapped-sorted vector z(Š) which is fed into the interference cancellation module 255 as well as the 2×2 QR-MLD demodulator 250.

The 2×2 QR-MLD demodulator 250 operates largely as known in the art (and shown in FIG. 1) to produce an output $b(S_3), b(S_4)$ for use in the soft bit reordering component 265 as well as soft bits corresponding to $\hat{x}(s_3), \hat{x}(s_4)$ for use in an interference cancellation module 255.

The interference cancellation module 255 receives input in the form of R(S), z(Š), R(Š), z(S) and the soft bits $\hat{x}(s_3), \hat{x}(s_4)$ from QR-MLD demodulator 250 in order to produce z'(Š) and z'(S) for output to the QR-MLD demodulator 260. Advantageously, the interference cancellation module 255 utilizes soft symbols for interference cancellation. Calculation of the soft symbols is described in more detail in FIG. 5 below.

The 2×2 QR-MLD demodulator 260 operates largely as known in the art (and shown in FIG. 1) to produce an output $b(S_1), b(S_2)$ for use in the soft bit reordering component 265.

The soft bit reordering component 265 receives as input $b(S_1), b(S_2)$ from the 2×2 QR-MLD demodulator 260 and $b(S_3), b(S_4)$ from the 2×2 QR-MLD demodulator 250 in order to produce multiple output streams b(1), b(2), b(3), b(4).

Figure 3:
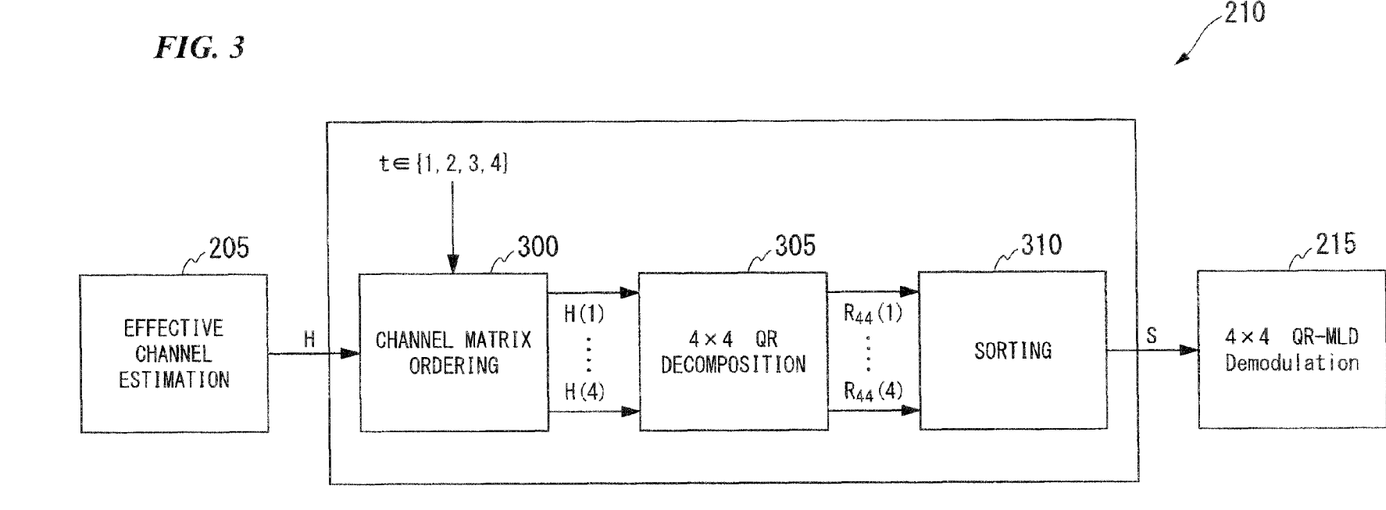
FIG. 3 is a block diagram of the components of a first option for 4×4 channel sorting according to an embodiment of the present invention.

FIG. 3 is a block diagram of the components of the channel sorting component 210 according to a first option (QR decomposition sorting) for 4×4 channel sorting according to an embodiment of the present invention. As shown in FIG. 2, a channel matrix H is provided for channel estimation by the channel estimation module 205. The channel matrix H feeds into the channel sorting component 210 to perform matrix column sorting in order to obtain a sorted channel matrix H(S) which improves the demodulation process. In the first sorting option (QR decomposition sorting) a channel matrix ordering component 300 is provided which receives as input the channel matrix H and transmit antenna ports which include any of 0, 1, 2 and 3. The input channel matrix H received from the effective channel estimation module 205 has a natural order before sorting such that $h_{ij}$ means the channel estimate for the i-th receive antenna regarding the j-th transmit antenna. The channel matrix ordering module 300 shuffles the input channel matrix H to generate 4 pre-arranged 4×4 channel matrices.

Each 4×4 matrix is then QR decomposed by the 4×4 QR decomposition module 305, which outputs a corresponding scalar value $R_{44}$. The sorting module 310 then sorts all 4 outputs from the 4×4 QR decomposition module 305 where all 4 outputs are put into an increasing order with $\{s_1, s_2, s_3, s_4\}=\{1, 2, 3, 4\}$ based on the elements of R matrices. The output of sorting component 310 is the vector S=[s1, s2, s3, s4] which represents the sorting order regarding the scalar value $R_{44}$ for each modified channel matrix.

Figure 4:
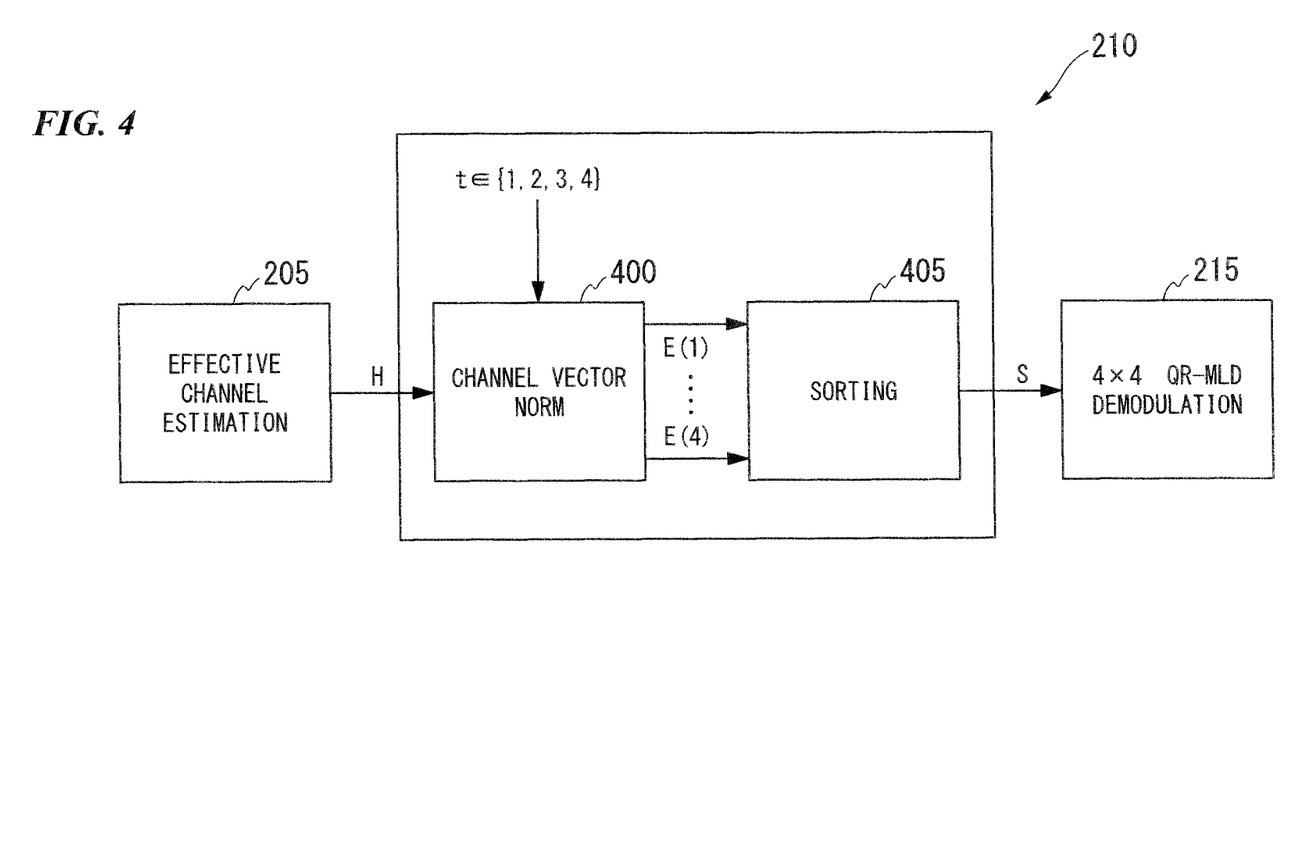
FIG. 4 is a block diagram of the components of a second option for 4×4 channel sorting according to an embodiment of the present invention.

FIG. 4 is a block diagram of the components of the channel sorting component 210 according to a second option (column norm sorting based on the total power received per transmit antenna port) for 4×4 channel sorting according to an embodiment of the present invention. As shown in FIG. 2, a channel matrix H is provided for channel estimation by the channel estimation module 205. The channel matrix H feeds into the channel sorting component 210 to perform matrix column sorting in order to obtain a sorted channel matrix H(S) which improves the demodulation process. In the second sorting option (column norm sorting), a channel vector norm component 400 is provided which receives as input the channel matrix H and transmit antenna ports which include any of 0, 1, 2 and 3. The input channel matrix H received from the effective channel estimation module 205 with the natural order before sorting such that $h_{ij}$ means the channel estimate for the i-th receive antenna regarding the j-th transmit antenna. The channel vector norm module 400 then calculates the norm for each column.

The sorting module 405 then sorts E(1), E(2), E(3) and E(4) in an increasing order $\{s_1, s_2, s_3, s_4\}=\{1, 2, 3, 4\}$ based on the norm of each column. The output of sorting component 405 is the vector S=[s1, s2, s3, s4] which represents the sorting order regarding the scalar norm for each column of the channel matrix H.

Figure 5:
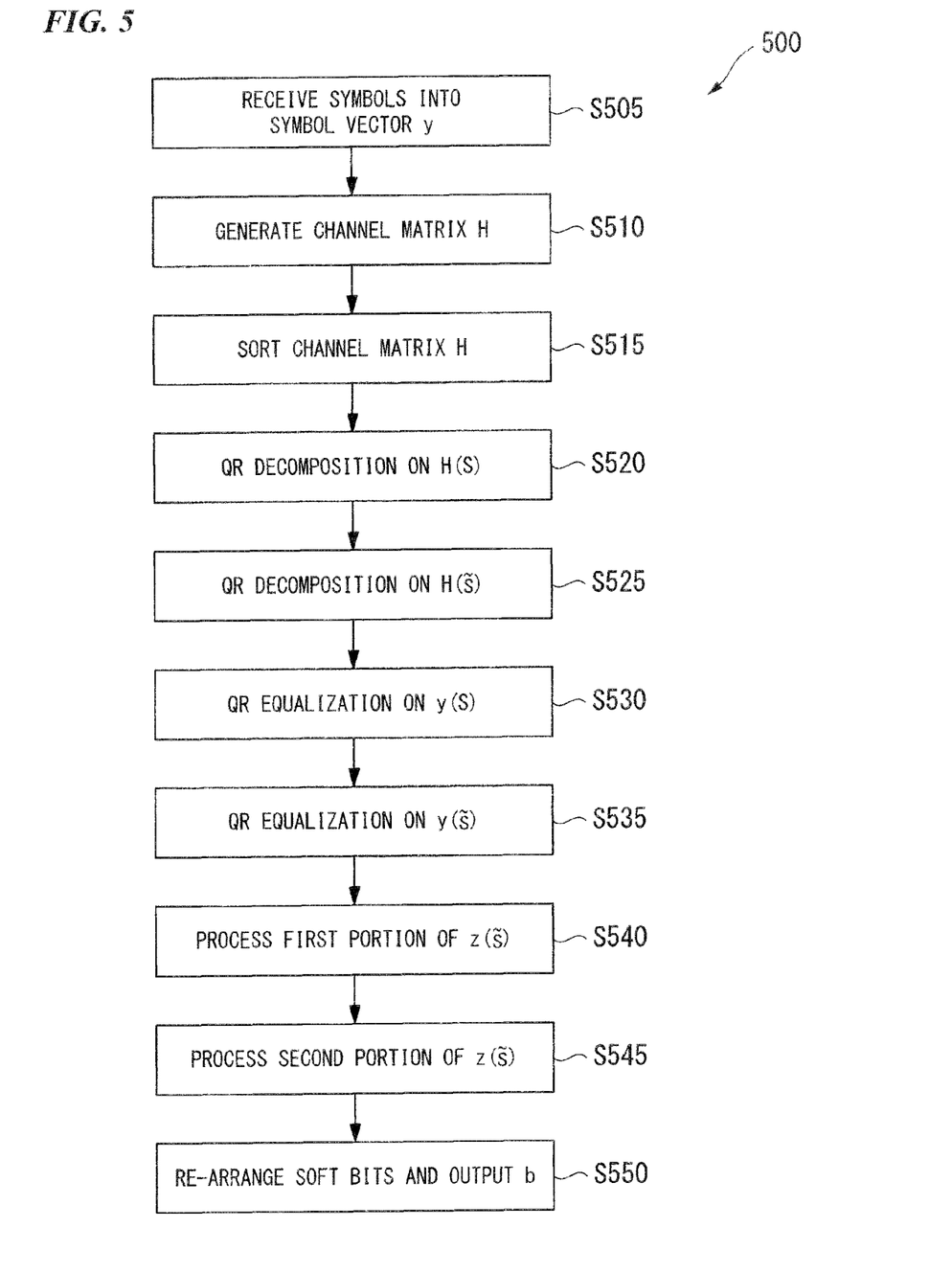
FIG. 5 is a flow diagram showing the steps in the method of the invention.

FIG. 5 shows the method 500 carried out by each of the modules in the QR-MLD demodulator 200 of FIG. 2 for processing plurality of data streams from a transmitter. At step 505 symbols are received simultaneously via multiple streams and the simultaneously received symbols are represented by a received symbol vector y. At step 510 an N×N channel matrix H is generated. N is the number of data streams and is preferably 4×4, but may be extended to 8×8. For simplicity, the description of the method will assume 4×4. Using the signal model y=Hx+n where y is the N×1 received signal vector, H is the N×N channel matrix, x is the N×1 transmitted symbols ($\{x_i\}$ are independent and identically distributed) and n is the N×1 Gaussian noise vector ($\{n_i\}$ are independent and identically distributed with variance $\sigma^2$). Taking the case of N=4, the signal model is as follows:

$$\begin{bmatrix} y_1 \\ y_2 \\ y_3 \\ y_4 \end{bmatrix} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \begin{bmatrix} x_1 \\ x_2 \\ x_3 \\ x_4 \end{bmatrix} + \begin{bmatrix} n_1 \\ n_2 \\ n_3 \\ n_4 \end{bmatrix}$$

$$y = [\, h(1) \quad h(2) \quad h(3) \quad h(4)\,]x + n$$

At step 515 the N×N (i.e. 4×4) channel matrix H is sorted to improve the demodulation process by providing an N×N (i.e. 4×4) sorted channel matrix H(S). By sorting the channel matrix H, the data stream with the strongest effective channel estimates is demodulated and then cancelled for the demodulation of other data streams. This in turn provides the sorting gain for the demodulation of the 4×4 system. As was described with reference to FIGS. 3 and 4, there are two ways of sorting the channel matrix H (i) QR decomposition sorting (as shown in FIG. 3) and (ii) Column norm sorting (as shown in FIG. 4).

(i) QR Decomposition Sorting

A QR decomposition is performed for the pre-defined channel matrices H(1), H(2), H(3) and H(4) to arrive at $$H(t)=Q(t)\times R(t), t\in\{1,2,3,4\}$$

where: $R_{44}(t)$ denotes the element in column 4 and row 4 of matrix R(t) and t is in the order of transmit antenna port 0, 1, 2 and 3. The pre-ordered matrixes are defined with index in the natural order regarding each transmit antenna. By applying QR decomposition to those 4 matrices, an element of each R matrix can be used for sorting to obtain the sorted vector $S=[s_1, s_2, s_3, s_4]$ with $\{s_1, s_2, s_3, s_4\}=\{1, 2, 3, 4\}$ (ii) Column Norm Sorting The norm of each column of the channel matrix is calculated. Then, by comparing the norm of each column, the sorted vector $S=[s_1, s_2, s_3, s_4]$ can be derived.

Once the channel matrix H is sorted, control moves to step 520 where a QR decomposition is performed on the sorted channel matrix H(S) to compute a Q(S) matrix and an R(S) matrix such that $H(S)=[h(s_1)\ h(s_2)\ h(s_3)\ h(s_4)]=Q(S) \times R(S)$, the Q(S) matrix being a unitary matrix and the R(S) matrix being an upper triangular matrix. A QR decomposition is then performed on a column-row-swapped-sorted-channel matrix H(Š) at step 525 to compute a swapped Q(Š) matrix and a swapped R(Š) matrix, the Q(Š) matrix being a unitary matrix and the R(Š) matrix being an upper triangular matrix.

At step 530 a QR equalization is performed on a sorted received symbol vector y(S) by multiplying the sorted received signal vector y(S) by the Hermitian of Q(S): $z(s)=Q^H(S)y(S)$.

A QR equalization is then performed at step 535 on a swapped received symbol vector y(Š) by multiplying by the Hermitian Q(Š).

At step 540 a first portion of z(S) and z(Š) is processed via a QR-MLD demodulation scheme to determine soft bits and soft symbols.

The soft bits corresponding to $x_{S_3}$, $x_{S_4}$ are output and used to then obtain the soft symbols. The soft symbols are obtained in the usual manner known in the art using $d_{total\ j}$ (i.e. the output of the Process receive symbols component 115 in FIG. 1) calculated during the 2×2 QR-MLD demodulation processes above.

Control then moves to step 545 where a second portion of z(S) and z(Š) is processed via a QR-MLD demodulation scheme to determine soft bits and soft symbols.

The soft bits corresponding to $x_{S_1}$, $x_{S_2}$, $x_{S_3}$, $x_{S_4}$ may then be fed into Forward Error Correction decoder component [not shown], e.g. a turbo decoder for further processing as required.

Control then moves to step 550, where the demodulated soft bits 540 and 545 are re-arranged based on the sorting sequence in step 515 (either QR decomposition sorting or column norm sorting) to resume the original transmission order and provide output b(1), b(2), b(3), b(4).

The method of the present invention may be extended to an 8×8 system, with z(Š) being broken up into two 4×4 systems at steps 540 and 545. Then each 4×4 system is broken up into two 2×2 systems. The first 4×4 system shall output 4 demodulated soft bits and 4 soft symbols. Those 4 soft symbols shall be used in the second 4×4 system, where 4 soft symbols are cancelled out in order to demodulate the remaining 4 data streams.

Although the exemplary embodiments of the invention have been disclosed for illustrative purposes, those skilled in the art will appreciate that various modifications, additions and substitutions are possible without departing from the scope of the present invention. Therefore, the present invention is not limited to the above-described embodiments but is defined by the following claims.

INDUSTRIAL APPLICABILITY

The present invention can be applied to wireless communications systems, and more particularly to a method for demodulating data transmitted over wireless communications systems.

The invention claimed is:

1. A method for processing a plurality of data streams from a transmitter, the method including:
   (a) receiving symbols via the plurality of data streams, the received symbols being represented by a received symbol vector y;
   (b) generating an N×N channel matrix H, using a signal model y=Hx+n, where x is the N×1 transmitted symbols and n is the N×1 Gaussian noise vector, and where N is the number of data streams;
   (c) sorting the N×N channel matrix H to provide an N×N sorted channel matrix H(S);
   (d) performing QR decomposition on the sorted channel matrix H(S) to compute a Q(S) matrix and an R(S) matrix such that H(S)=Q(S)R(S), the Q(S) matrix being a unitary matrix and the R(S) matrix being an upper triangular matrix;
   (e) performing QR decomposition on a column-row-swapped-sorted-channel matrix H (Š) to compute the corresponding Q(Š) matrix and R(Š) matrix such that H(Š)=Q(Š)×R(Š), the Q(Š) matrix being a unitary matrix and the R(Š) matrix being an upper triangular matrix;
   (f) performing QR equalization on a sorted received symbol vector y(S), which is produced by sorting the receiving symbol vector y to provide a equalized-sorted vector z(S);
   (g) performing QR equalization on a swapped received symbol vector y(Š) to provide a equalized-swapped-sorted vector z(Š);
   (h) processing a first portion of z(S) and z(Š) via a QR-maximum likelihood detection (MLD) demodulation scheme to determine soft bits and soft symbols;
   (I) processing a second portion of z(S) and z(Š) via a QR-maximum likelihood detection (MLD) demodulation scheme to determine soft bits and soft symbols;
   (j) rearrange soft bits in steps (h) and (I) to provide an output vector b.

2. The method of claim 1, wherein N=4 and sorting of the 4×4 channel matrix H to provide a 4×4 sorted channel matrix H(S) at step (c) includes the following steps:
   (a) generating pre-arranged matrices H(1), H(2), H(3) and H(4);
   (b) performing QR decomposition on H(t)=Q(t)×R(t), t∈{1, 2, 3, 4};
   (c) utilizing an element of each R matrix for sorting such that $S=[s_1,s_2,s_3,s_4]$.

3. The method of claim 1, wherein N=4 and sorting of the 4×4 channel matrix H to provide a 4×4 sorted channel matrix H(S) at step (c) includes the following steps:
   (a) calculating a norm of each column of the channel matrix H;
   (b) comparing the norm of each column to obtain a sorted vector $S=[s_1,s_2,s_3,s_4]$.

4. The method of claim 1, wherein N=4 and the sorted channel matrix H(S) is given by the expression: $H(S)=[h(s_1)\ h(s_2)h(s_3)h(s_4)]=Q(S)\times R(S)$.

5. The method of claim 1, wherein N=4 and the column-row-swapped-sorted-channel matrix H(Š) is obtained.

6. The method of claim 1, wherein N=4 and performing QR equalization on a sorted received symbol vector y(S) to provide a equalized-sorted vector z(S) is determined by the following steps:
   (a) multiplying a sorted received symbol vector y(S) by a Hermitian $Q^H(S)$ of the Q(S) matrix such that $z(S)=Q^H(S)y(S)$;
   (b) obtaining the equalized-sorted vector z(S).

7. The method of claim 1, wherein N=4 and performing QR equalization by multiplying the swapped received symbol vector y(Š) by a Hermitian $Q^H(Š)$ of the Q(Š) matrix such that $z(Š)=Q^H(Š)\times y(S)$ where z(Š) is the equalized-swapped-sorted vector.

8. The method of claim 7, wherein the first portion of z(S) and z(S̃) is used to calculate soft bits $x_{S_3}$, $x_{S_4}$.

9. The method of claim 8, wherein a total distance metric $d_{total\,j}$ is calculated to provide soft symbol $\hat{x}_{s_4}$ and $\hat{x}_{s_3}$.

10. The method of claim 7, wherein the second portion of z(S) and z(S̃) with the calculated soft symbol $\hat{x}_{s_4}$ and $\hat{x}_{s_3}$ are used to calculate soft bits $x_{S_1}$, $x_{S_2}$.

11. The method of claim 10, wherein the soft bits $x_{S_1}$, $x_{S_2}$, $x_{S_3}$, $x_{S_4}$ are fed into a Forward Error Correction (FEC) decoder for further processing.

12. The method of claim 11, wherein the soft bits $x_{S_1}$, $x_{S_2}$, $x_{S_3}$, $x_{S_4}$, are rearranged to provide an output vector b.

* * * * *